Sept. 8, 1959 CHI-SHENG KUO 2,903,152
CLOSURE AND SEAL FOR PRESSURE VESSELS
Filed Sept. 24, 1954 2 Sheets-Sheet 1

INVENTOR.
CHI-SHENG KUO,
BY
Wm. P. Spielman
ATTORNEY.

Sept. 8, 1959   CHI-SHENG KUO   2,903,152
CLOSURE AND SEAL FOR PRESSURE VESSELS
Filed Sept. 24, 1954   2 Sheets-Sheet 2
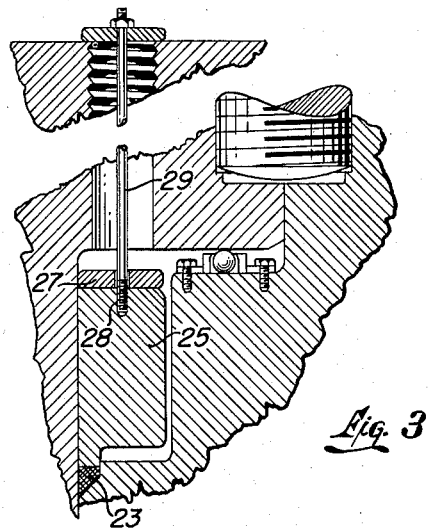
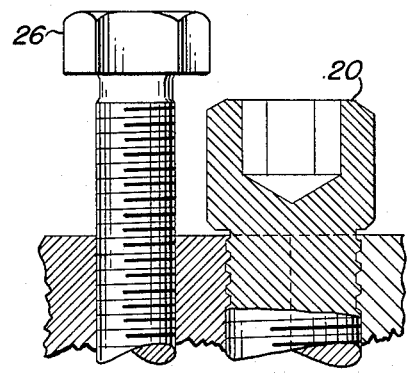
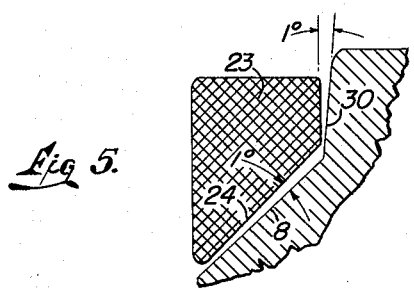
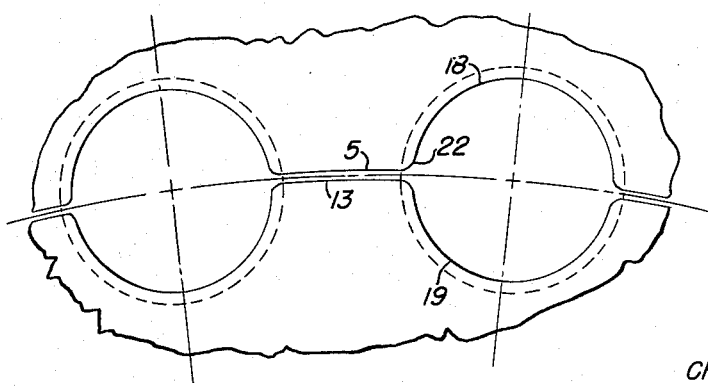
INVENTOR.
CHI-SHENG KUO,
BY
ATTORNEY.

United States Patent Office 2,903,152
Patented Sept. 8, 1959

2,903,152

CLOSURE AND SEAL FOR PRESSURE VESSELS

Chi-Sheng Kuo, Woodside, N.Y., assignor to Chemical Construction Corporation, New York, N.Y., a corporation of Delaware Application September 24, 1954, Serial No. 458,160

3 Claims. (Cl. 220—46)

This invention relates to pressure vessels of the type used in carrying out heat exchange and chemical reactions under high pressures such as heat exchangers, autoclaves, catalytic converters for vapor phase reactions and the like. Although not limited thereto, the invention will be described with particular reference to a catalytic converter of the type used in reacting nitrogen and hydrogen for the synthesis of ammonia and in reacting carbon monoxide and hydrogen for the production of alcohols and aliphatic hydrocarbons. Such reactions are usually carried out under superatmospheric pressures on the order of 1,000 to 15,000 pounds per square inch, and therefore require very thick shells and heads to maintain such pressures. The fabrication of such converters, and particularly the machining of closely fitting parts, is very expensive and presents a number of difficulties in design and construction.

The main objectives of the present invention are the provision of a pressure vessel having a sufficiently strong and sturdy connection between the head and the converter shell to withstand the thrust of the internal pressure against the head which is compact and relatively inexpensive and to provide a suitable seal or gasket structure that will prevent leakage of gas from the interior of the vessel around the joint between the head and the shell. It is a principal object of the present invention to provide a closure and seal that is simple in construction and does not require extensive precise machining of the parts to close tolerances, and that is therefore less expensive to fabricate than previous closures of this type.

The principal features of the present invention responsible for its improved simplicity and cheapness of construction are, first, the provision of a much simpler means for attaching the head of the pressure vessel to the shell and transmitting thereto the thrust of the head, and secondly, a sealing means located in an annular recess in the shell and operated by the pressure of screws located in the head. The result of this combination is that the pressure on the gasket is entirely independent of the thrust of the internal pressure against the head, and the pressure developed against the gasket by tightening its actuating screws is transmitted through the head to the shell. This permits the application and maintenance of a uniform pressure on the gasket sufficient to maintain a tight joint regardless of the rise and fall in the operating pressure of the converter or autoclave.

The invention will be further described with reference to the accompanying drawings which illustrate an embodiment thereof as applied to a high pressure catalytic converter. Referring to these drawings:

Fig. 3 is an enlarged detail of a portion of Fig. 1 with an actuating screw removed and replaced by a tie-rod used in assembling and disassembling the converter.

Fig. 4 is an enlarged detail of a portion of Fig. 1 showing a modified form of screw.

Fig. 5 is an enlarged detail of another portion of Fig. 1 showing the annular gasket seat in the converter shell and the gasket therein, and Fig. 6 is an enlarged detail on the line 6—6 of Fig. 2 showing the rounded corners of the screw socket.

Figure 1:
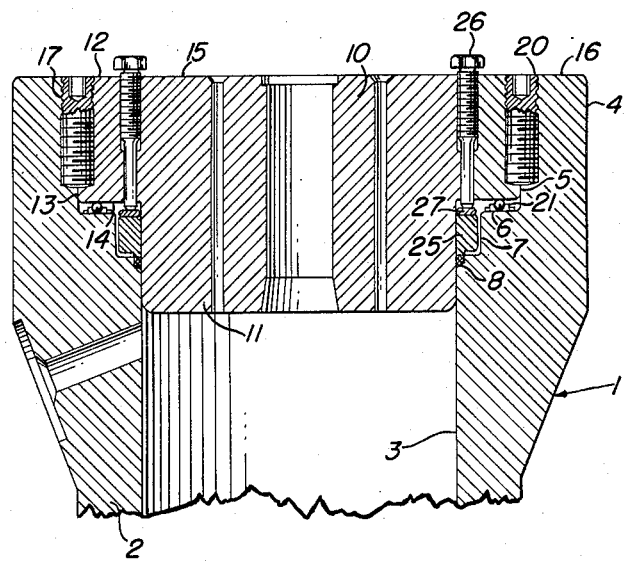
Fig. 1 is a diametrical section through the head end of a converter embodying the invention, taken on the line 1—1 of Fig. 2.
Figure 2:
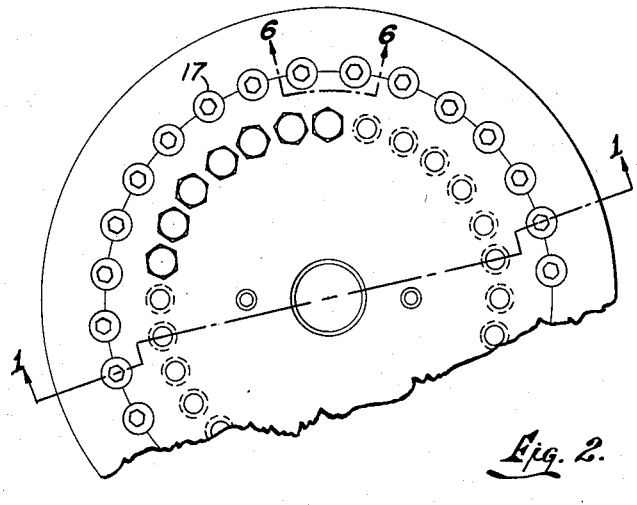
Fig. 2 is an end view of the head end of the converter with parts broken away.

Referring to Figs. 1 and 2 the converter, autoclave or other pressure vessel indicated generally by reference numeral 1 comprises a pressure-resistant shell 2 having a cylindrical bore 3, an end 4 of larger internal diameter than the bore and having a preferably cylindrical inner surface 5 terminating inwardly in an annular shoulder 6, and an annular recess 7 in the inner wall or bore 3 with an inclined gasket seat 8 at its inner edge. The head or closure 10 is a cylindrical block 11, adapted to fit into the bore 3 of the converter and having a flanged outer portion 12 fitting into its end 4 with its outermost surface 13 engaging the inner surface 5 of the shell and its lower edge 14 resting on the shoulder 6. When so located the outer surface 15 of the head is flush with the end surface 16 of the converter.

By arranging the parts as described the head 10 is in abutting engagement with the cylindrical inner surface 5 of the end 4 of the converter shell. This permits the use of a very simple and inexpensive but highly efficient means for holding the two parts together and withstanding the thrust of the internal pressure on the head. At the junction of the surfaces 5 and 13 a series of threaded bolt holes or sockets is made which bridge the line of junction between the two parts. These sockets, which are indicated generally by reference numeral 17, appear as a series of internally threaded semicircular grooves 18 (Fig. 6) in the inner wall 5 and a corresponding series of internally threaded semi-circular grooves 19 in the outer surface 13 of the head 10 when the two parts are separated. Screws 20, which may be of any desired type but which preferably are of the kind hereinafter described, are inserted into the sockets 17 and serve effectively to hold the parts together.

In assembling the closure the head 10 is inserted into the bore 3 until its flanged outer portion 12 rests on the shoulder 6, after which the semicircular grooves 19 must be brought into alignment with the corresponding grooves 18 in the shell. In order to facilitate this alignment, particularly in large sized converters, bearings 21 may be mounted on the annular shoulder 6. The bearings illustrated are ball bearings held in suitable cages, but it will be evident that any other type of bearing may be used if desired.

The preferred type of thread for the retaining screws 20 is American Standard Stub Acme thread, since it gives better strength than square types of thread. Under operating conditions the Acme thread will carry any reasonable amount of load. In order to prevent binding between the screws and the screw holes the edges formed by the intersection of the semicircular grooves 18 and 19 with the surfaces 5 and 13 are rounded as shown at 22 in Fig. 6. In addition, if desired, the screws may be made of a metal having a higher yield strength than that of the shell flange and head block. This avoids deformation of the threads of the screws. The screws are so dimensioned that the stresses in bearing surfaces will not exceed the yield points of the shell and the head; therefore, no permanent deformation of screw threads will take place. Adequate backlash between the screws and the threaded holes may also be provided to give an additional protection against any binding of the threads.

In all of the converter and autoclave closures with which I am familiar the arrangement of parts has been designed for the purpose of drawing the head tightly against the shell. Frequently a retaining ring is used which fits over the head and presses it against the shell by means of stud bolts. In contrast, the above-described arrangement of my present invention is based on a recognition of the fact that it is sufficient simply to fasten the head to the shell by screws which will transmit to the shell the pressure on the head, and that positive means for pressing the head against the shell are unnecessary. The screws 20 are simply load-carrying elements, and since they bridge any gap between the head and the shell machining of these parts to close tolerances is unnecessary. The internal pressure of the converter is maintained by a sealing means which will now be described.

As has been stated above, the cylindrical bore 3 of the converter shell is provided with an annular recess 7 which terminates in an inclined gasket seat 8 at its inner edge. This seat is adjacent to the outer surface of the cylindrical block 11. An annular gasket 23 is located in the seat 8 and, as is shown in detail in Fig. 5, is adapted to press against this seat and against the block 11, thereby preventing the leakage of gas past the two parts. Preferably a small angle on the order of 1° is allowed between the gasket seat 8 and the adjacent surface 24 of the gasket to improve the sealing and a similar angle with the surface 30 makes the gasket easier to remove from its seat.

In order to maintain sufficient pressure on the gasket for a tight seal a follower ring 25 is provided. This ring is located in the annular recess 7 in the converter shell, but its thickness is preferably less than the width of this recess and the ring is preferably made of a slightly flexible material such as spring steel. A ring of actuating screws 26 presses on top of the ring and under this pressure the ring flexes slightly. This provides the principle of "unsupported area," in addition to the flexibility in the head and in its retaining screws 20, and thus a uniform pressure is applied to the gasket at all times. The gasket is preferably made of copper, aluminum alloy or other metal which is relatively soft in comparison with the steel of which the shell and block are composed. It may be cemented to the ring 25 with shellac or glue if desired to minimize the risk of damaging it during assembly.

In order to prevent damage to the ring 25 by the screws 26, an annular protecting ring 27 may be interposed if desired. Preferably tapped holes 28 are made in the ring 25 at intervals in alignment with the screws 26; these are intended to receive tie-rods 29 to hold the ring 25 and the gasket 23 in place during assembly or dismounting of the closure as shown in Fig. 3.

From the foregoing description of a preferred embodiment of the invention it will be seen that the objects thereof are accomplished. The load-bearing portion of the closure between the head and the shell requires very little precise machining, and is much less expensive to fabricate than conventional vessel heads. For the same size of vessels, the maximum periphery of thread engagement is about three times as much as that in the breech block type, which makes it possible to reduce materially the length required for the threaded portion. This contributes further to the savings effected by the invention. The sealing means used to retain the internal pressure of the converter likewise requires very little precise machining; only the gasket seat 8 and the adjacent area of the block 11 require grinding to a smooth finish. The holes for the actuating screws 26 can be made and tapped without undue expense, since they are in the head, and the follower ring 25 and its attached gasket are relatively inexpensive. Estimates have shown that a saving of many thousands of dollars can be effected in a single catalytic converter by means of the invention.

Although the invention has been described in detail with reference to a particular embodiment thereof, it will be understood that variations, modifications and rearrangement of parts may be resorted to within the scope of the appended claims.

What I claim is:

1. A pressure vessel comprising a pressure-resistant cylindrical shell, a head having a cylindrical block fitting into said shell in abutting engagement therewith, means for attaching the head to the shell and transmitting thereto the thrust of said head, and a seal between the head and the shell comprising an annular recess in the inner wall of said shell having an inclined gasket seat at its inner edge adjacent said cylindrical head block, an annular deformable metal gasket in said seat, a flexible annular sealing ring in said recess in engagement with said gasket, said ring having a thickness less than the width of said recess and being free to flex therein, and a series of screws in said head adapted to press the sealing ring against the gasket.

2. A pressure vessel comprising a pressure-resistant cylindrical shell, a head having a cylindrical block fitting into said shell in abutting engagement therewith and an outer cylindrical flange in abutting relation with the inner surface of a cylindrical end of said shell, a series of threaded sockets bridging the line of junction between said shell and said flange and screws in said sockets transmitting to the shell the thrust of said head, and a seal between the head and shell comprising an annular recess in the inner wall of said shell having an inclined gasket seat at its inner edge adjacent said cylindrical head block, an annular deformable metal gasket in said seat, an annular sealing ring in said recess in engagement with said gasket, and a series of screws in said flange adapted to press the sealing ring against the gasket.

3. A pressure vessel in accordance with claim 2, in which there is provided rotatable bearings within said annular recess adjacent the flange of said cylindrical head block to facilitate rotation of said head to bring the series of threaded sockets into alignment for insertion of screws therein.

References Cited in the file of this patent

UNITED STATES PATENTS

| 1,841,882 | De Francisci | Jan. 19, 1932 |
| 2,524,592 | Cordes | Oct. 3, 1950 |
| 2,617,554 | Smith | Nov. 11, 1952 |

FOREIGN PATENTS

| 691,144 | Germany | May 17, 1940 |
| 963,387 | France | Dec. 26, 1949 |